United States Patent
Jin et al.

(10) Patent No.: US 9,607,265 B2
(45) Date of Patent: Mar. 28, 2017

(54) ACCURATE AND FAST NEURAL NETWORK TRAINING FOR LIBRARY-BASED CRITICAL DIMENSION (CD) METROLOGY

(71) Applicants: Wen Jin, Fremont, CA (US); Vi Vuong, Fremont, CA (US); Junwei Bao, Los Altos, CA (US); Lie-Quan Lee, Fremont, CA (US); Leonid Poslavsky, Belmont, CA (US)

(72) Inventors: Wen Jin, Fremont, CA (US); Vi Vuong, Fremont, CA (US); Junwei Bao, Los Altos, CA (US); Lie-Quan Lee, Fremont, CA (US); Leonid Poslavsky, Belmont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 639 days.

(21) Appl. No.: 14/044,729

(22) Filed: Oct. 2, 2013

(65) Prior Publication Data
US 2014/0032463 A1    Jan. 30, 2014

Related U.S. Application Data

(63) Continuation of application No. 13/041,253, filed on Mar. 4, 2011, now Pat. No. 8,577,820.

(51) Int. Cl.
*G06F 15/18*    (2006.01)
*G06N 3/08*    (2006.01)
*G06N 3/04*    (2006.01)

(52) U.S. Cl.
CPC ............. *G06N 3/08* (2013.01); *G06N 3/0454* (2013.01)

(58) Field of Classification Search
None
See application file for complete search history.

(56) References Cited

U.S. PATENT DOCUMENTS 5,862,513 A * 1/1999 Mezzatesta ............ G01V 1/282
                                                                    702/9
7,372,583 B1    5/2008 Jin et al.
(Continued)

FOREIGN PATENT DOCUMENTS

CN    1799045    7/2006
CN    101299237    11/2008
(Continued)

OTHER PUBLICATIONS

Vidya Rajagopalan, "Neural Network Based Prognosis System for Two-Dimensional Tumor-Like Growth", 2005, Florida State University, pp. 1-5.*

(Continued)

*Primary Examiner* — Paulinho E Smith
(74) *Attorney, Agent, or Firm* — Blakely Sokoloff Taylor & Zafman, LLP

(57) ABSTRACT

Embodiments are generally directed to neural network training for library-based critical dimension metrology. An embodiment of a method includes optimizing a threshold for a principal component analysis of a spectrum data set to provide a principal component value, estimating a training target for one or more neural networks, training the one or more neural networks based both on the training target and on the principal component value provided from optimizing the threshold for the principal component analysis, and providing a spectral library based on the one or more trained neural networks.

8 Claims, 16 Drawing Sheets

(56) References Cited

U.S. PATENT DOCUMENTS

| | | | |
|---|---|---|---|
| 7,710,579 B2 | 5/2010 | Yamaguchi et al. | |
| 2004/0059695 A1 | 3/2004 | Xiao et al. | |
| 2004/0230545 A1 | 11/2004 | Littlefield et al. | |
| 2005/0049855 A1* | 3/2005 | Chong-White | G10L 19/173 704/219 |
| 2008/0255801 A1* | 10/2008 | Jin | G03F 7/70625 702/181 |
| 2009/0157579 A1 | 6/2009 | Rai | |
| 2011/0286001 A1 | 11/2011 | Taniguchi et al. | |

FOREIGN PATENT DOCUMENTS

| | | |
|---|---|---|
| CN | 101807301 | 8/2010 |
| JP | 2007-528985 | 10/2007 |
| JP | 2008-76379 | 4/2008 |
| WO | WO-2005/003911 | 1/2005 |
| WO | WO-2010/084884 | 7/2010 |
| WO | WO-2010/150265 | 12/2010 |

OTHER PUBLICATIONS

First Office Action dated Aug. 11, 2015 (+ English translation), in Chinese Patent Application No. 201280010987.4, 18 pages.
International Search Report and Written Opinion from PCT/US2012/026927 mailed Dec. 26, 2012, 10 pgs.
International Preliminary Report on Patentability from PCT/US2012/026927 mailed Sep. 19, 2013, 7 pgs.
Non-Final Office Action from U.S. Appl. No. 13/041,253 mailed Mar. 28, 2013, 13 pgs.
Rajagopalan, Vidya "Neural Network Based Prognosis System for Two-Dimensional Tumor-Like Growth," (2005) Florida State University, pp. 1-54.

\* cited by examiner

ACCURATE AND FAST NEURAL NETWORK TRAINING FOR LIBRARY-BASED CRITICAL DIMENSION (CD) METROLOGY

CROSS-REFERENCE TO RELATED APPLICATIONS

This application is a continuation of U.S. patent application Ser. No. 13/041,253, filed Mar. 4, 2011, the entire contents of which are hereby incorporated by reference herein.

TECHNICAL FIELD

Embodiments of the present invention are in the field of optical metrology, and, more particularly, relate to approaches for accurate and fast neural network training for library-based critical dimension (CD) metrology.

BACKGROUND

Optical metrology techniques generally referred to as scatterometry offer the potential to characterize parameters of a workpiece during a manufacturing process. In practice, light is directed onto a periodic grating formed in a workpiece and spectra of reflected light is measured and analyzed to characterize the grating parameters. Characterization parameters may include critical dimensions (CD), sidewall angle (SWA), feature height (HT), etc. which effect a material's reflectivity and refractive index. Characterization of the grating may thereby characterize the workpiece as well as a manufacturing process employed in the formation of the grating and the workpiece.

For the past several years, a rigorous couple wave approach (RCWA) and similar algorithms have been widely used for the study and design of diffraction structures. In the RCWA approach, the profiles of periodic structures are approximated by a given number of sufficiently thin planar grating slabs. Specifically, RCWA involves three main operations, namely, the Fourier expansion of the field inside the grating, calculation of the eigenvalues and eigenvectors of a constant coefficient matrix that characterizes the diffracted signal, and solution of a linear system deduced from the boundary matching conditions. RCWA divides the problem into three distinct spatial regions: 1) the ambient region supporting the incident plane wave field and a summation over all reflected diffracted orders, 2) the grating structure and underlying non-patterned layers in which the wave field is treated as a superposition of modes associated with each diffracted order, and 3) the substrate containing the transmitted wave field.

The accuracy of the RCWA solution depends, in part, on the number of terms retained in the space-harmonic expansion of the wave fields, with conservation of energy being satisfied in general. The number of terms retained is a function of the number of diffraction orders considered during the calculations. Efficient generation of a simulated diffraction signal for a given hypothetical profile involves selection of the optimal set of diffraction orders at each wavelength for both transverse-magnetic (TM) and/or transverse-electric (TE) components of the diffraction signal. Mathematically, the more diffraction orders selected, the more accurate the simulations. However, the higher the number of diffraction orders, the more computation is required for calculating the simulated diffraction signal. Moreover, the computation time is a nonlinear function of the number of orders used.

SUMMARY

Embodiments of the present invention include approaches for accurate and fast neural network training for library-based CD metrology.

In an embodiment, a method of accurate neural network training for library-based CD metrology includes optimizing a threshold for a principal component analysis (PCA) of a spectrum data set to provide a principal component (PC) value. A training target for one or more neural networks is estimated. The one or more neural networks are trained based both on the training target and on the PC value provided from optimizing the threshold for the PCA. A spectral library is provided based on the one or more trained neural networks.

In another embodiment, a machine-accessible storage medium has instructions stored thereon which cause a data processing system to perform a method of accurate neural network training for library-based CD metrology. The method includes optimizing a threshold for a principal component analysis (PCA) of a spectrum data set to provide a principal component (PC) value. A training target for one or more neural networks is estimated. The one or more neural networks are trained based both on the training target and on the PC value provided from optimizing the threshold for the PCA. A spectral library is provided based on the one or more trained neural networks.

In an embodiment, a method of fast neural network training for library-based CD metrology includes providing a training target for a first neural network. The first neural network is trained. The training includes starting with a predetermined number of neurons and iteratively increasing the number of neurons until an optimized total number of neurons is reached. A second neural network is generated based on the training and the optimized total number of neurons. A spectral library is provided based on the second neural network.

In another embodiment, a machine-accessible storage medium has instructions stored thereon which cause a data processing system to perform a method of fast neural network training for library-based CD metrology. The method providing a training target for a first neural network. The first neural network is trained. The training includes starting with a predetermined number of neurons and iteratively increasing the number of neurons until an optimized total number of neurons is reached. A second neural network is generated based on the training and the optimized total number of neurons. A spectral library is provided based on the second neural network.

DETAILED DESCRIPTION

Approaches for accurate and fast neural network training for library-based CD metrology are described herein. In the following description, numerous specific details are set forth, such as examples of neural networks, in order to provide a thorough understanding of embodiments of the present invention. It will be apparent to one skilled in the art that embodiments of the present invention may be practiced without these specific details. In other instances, well-known processing operations, such as operations involved with fabricating grating structures, are not described in detail in order to not unnecessarily obscure embodiments of the present invention. Furthermore, it is to be understood that the various embodiments shown in the figures are illustrative representations and are not necessarily drawn to scale.

With the increasing complexity of semiconductor and related structures, library formation for optical critical dimension simulation faces challenges of obtaining good accuracy for many recent applications. For example, a user may spend weeks to build different libraries only to have difficulty in achieving good library-regression matching and good total metrology uncertainty (TMU) to reference metrology. Aspects of the present invention may provide high accuracy libraries, yet with small library sizes and fast solutions for a user. A user may not need to spend weeks to build a plethora of different libraries but yet obtain good accuracy.

A number of training methods with an iterative nature have been implemented for library development and comparison. They include variations of Levenberg-Marquardt, back-propagation, and N2X algorithms. The issue with such approaches may be that they can be very time-consuming. If the number of neurons is guessed right, the algorithms will converge with a large number of iterations. If the number of neurons is too small, they will not converge and stop until they hit the maximal number of iterations.

Figure 1:
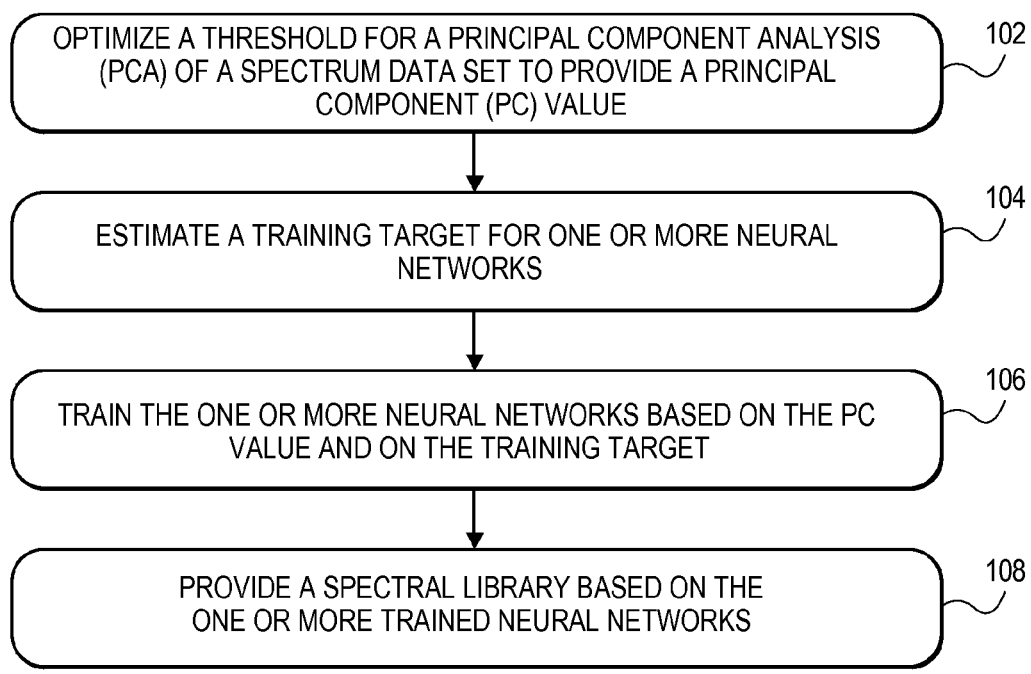
FIG. 1 depicts a flowchart representing an exemplary series of operations for accurate neural network training for library-based CD metrology, in accordance with an embodiment of the present invention.

In an aspect of the present invention, an accurate neural network training approach is provided. FIG. 1 depicts a flowchart 100 representing an exemplary series of operations for accurate neural network training for library-based CD metrology, in accordance with an embodiment of the present invention.

Referring to operation 102 of flowchart 100, a method includes optimizing a threshold for a principal component analysis (PCA) of a spectrum data set. In an embodiment, the optimizing is to provide a principal component (PC) value. In an embodiment, the optimizing is to minimize an error introduced by the PCA. The spectrum data set may be based on a measured or simulated spectrum derived from a diffraction measurement of a grating structure, as described in more detail below.

In accordance with an embodiment of the present invention, the PCA threshold is automatically optimized. The optimizing may minimize the error introduced by PCA into subsequent neural network training. For example, conventional approaches typically utilize a constant value for PCA threshold, e.g., with a PCA-introduced error having a magnitude of approximately $10^{-5}$. In one embodiment, optimizing the threshold for the PCA includes determining a lowest level spectrum domain. In one specific such embodiment, the PCA-introduced error has a magnitude less than $10^{-5}$, e.g., a magnitude of approximately $10^{-8}$ to $10^{-9}$.

In an embodiment, optimizing the threshold for the PCA includes determining a first PCA threshold. For example, a given PCA threshold or fraction number may be set at a threshold of $t=10^{-5}$. The PCA is applied to a spectrum data set. For example, PCA is applied to a spectrum data set S to obtain PC values $P=T*S$, where T is a matrix. A spectrum error introduced by applying the PCA is calculated. For example, $\Delta S = S - T'*P$, where T' is the transpose of T. The spectrum error is then compared to a spectrum noise level. In one embodiment, the spectrum noise level is based on optical critical dimension (OCD) hardware specification information. Hardware specification information may be associated with hardware such as the system described in association with FIG. 9, below.

When comparing the spectrum error to a spectrum noise level, the following criteria may be applied: $\epsilon$ is given criteria or spectrum noise level as default, if ΔS<ε output t, otherwise t=t/10 and the optimizing is repeated. Thus, in one embodiment, if the spectrum error is less than the spectrum noise level, the first PCA threshold is set to the PC value. In another embodiment, if the spectrum error is greater than or equal to the spectrum noise level, a second PCA threshold is determined, and the applying, the calculating, and the comparing is repeated.

In an embodiment, optimizing the training target for the PCA includes using a Mueller domain error tolerance. For example, for current art in library training, an error target for each PCA may be set to $10^{-5}$. There is no clear reason for the setting of the error target at such a value and there is no relation between the PCA $10^{-5}$ error target and an associated spectrum error. And, it is not necessarily advantageous to set every PCA to the same error target since their contribution to the spectrum may be different. In the following exemplary approach, the Mueller domain error tolerance is converted to each PCA domain error tolerance and set as the PCA training target.

Prior to training, the neural network training profile is converted to Mueller. From Mueller Elements (ME), a normalization is performed for each wavelength based on the training sample data. Then, PCA is performed on the normalized Mueller Elements (NME) to obtain PC signals for training. So, $i^{th}$ sample at $j^{th}$ wavelength Mueller Elements ($M_{ij}$) can be written as the following:

$$Mij = \sum_{p=0}^{PC\#} PC_{ip} * t_{pj} * \text{Std}_j + \text{Mean}_j$$

PC#: total PC number
$\text{Std}_j$, $\text{Mean}_j$: jth Wavelength standard deviation and mean value For every sample I, $PC_{ip}$ is always multiplied by the same factor to form Mueller Elements. If the $M_{ij}$ error tolerance is set to 0.001, then pth PC will have the error budget as the following:

$$ETp = \left( \frac{0.001/PC\#}{\underset{j}{\text{Max}} \ (t_{pj} * \text{Std}_j)} \right),$$

where ETp is the error tolerance of the $p^{th}$ principal component value. During training, each PC will have its own training target, and the neuron number is increased for the network in order to meet the training error target.

Referring to operation 104 of flowchart 100, the method further includes estimating a training target for one or more neural networks.

In accordance with an embodiment of the present invention, a more accurate training target is used for each neural network. In one such embodiment, the PCA and normalization are taken into account to estimate the training target for each neural network. In an embodiment, the training target is estimated based on PCA transformation and hardware signal noise level.

Referring to operation 106 of flowchart 100, the method further includes training the one or more neural networks based on the training target and on the PC value.

In accordance with an embodiment of the present invention, overtraining detection and control is performed. The approach may be used to detect and control overtraining while increasing the number of neurons and overtraining during Levenberg-Marquardt (LM) iterations. In an embodiment, the training is also based on the training target of operation 104 above. It is to be understood that the training may be based on more than one optimized PC value and, likely, on many optimized PC values. Also a combination of unoptimized and optimized PC values may be used.

Referring to operation 108 of flowchart 100, the method further includes providing a spectral library based on the one or more trained neural networks. In an embodiment, the spectral library is a high accuracy spectral library.

In accordance with an embodiment of the present invention, a high accuracy library with good generalization is provided. In one such embodiment, based on the individual error target for each training output domain, a dynamic increasing neuron number method is developed by checking both training set error and validation set error method to have high accuracy and good generalization neuron net based library. Previous neuron number iteration weights may be used as initial weights for current neural network structures to speed up training.

In an exemplary embodiment, a method has been developed to improve neuron net training in several different areas in the whole library training method for CD metrology. From the testing, substantial improvements on library regression matching has been achieved. For example, library error ranges (such as 3-sigma error ranges) can be more than 10 times smaller than the library generated from previous training approaches. The range of error may be close to precision level while implementing a much smaller training set. Using a dynamic increasing sample library approach may provide improved convergence behavior versus conventional methods, and may only require a much smaller sample set for building an improved library. A benefit of a dynamic increasing sample library approach is that high accuracy to precision level, smaller library size and fast solution for user to obtain a very good library as the final solution.

Figure 2A:
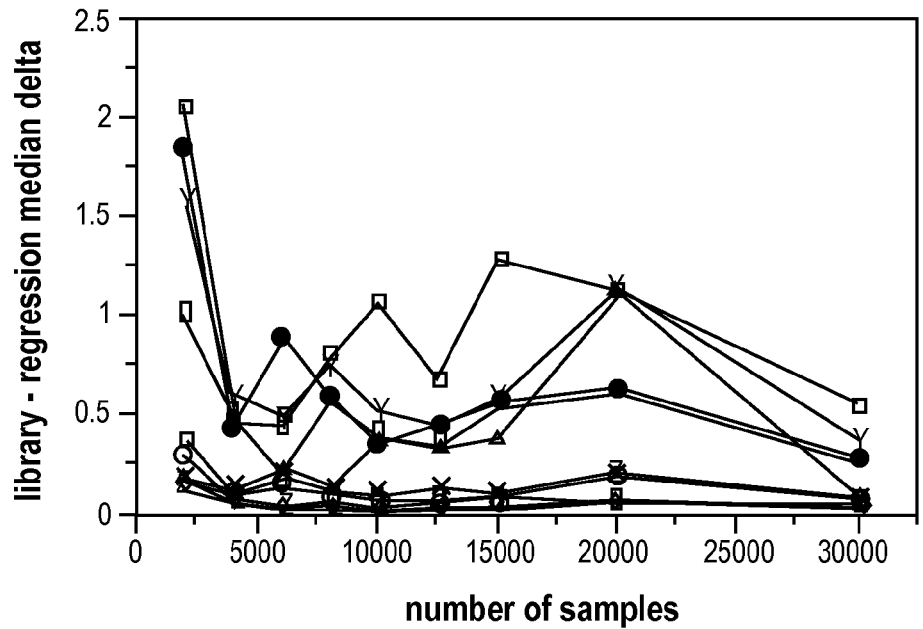
FIG. 2A is a plot demonstrating library-regression matching with a dynamic increasing sample library approach in an OFF state.
Figure 2B:
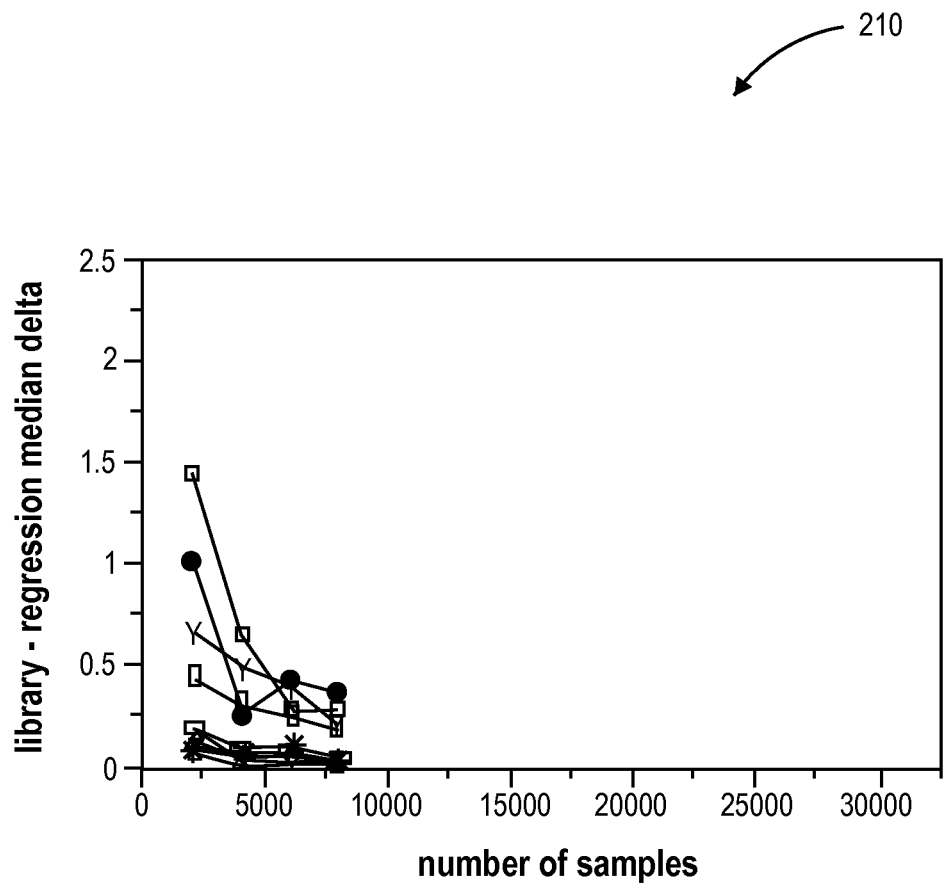
FIG. 2B is a plot demonstrating library-regression matching with a dynamic increasing sample library approach in an ON state, in accordance with an embodiment of the present invention.

FIG. 2A is a plot 200 demonstrating library-regression matching with a dynamic increasing sample library approach in an OFF state. FIG. 2B is a plot 210 demonstrating library-regression matching with a dynamic increasing sample library approach in an ON state, in accordance with an embodiment of the present invention. Referring to FIGS. 2A and 2B, with a dynamic increasing sample library approach ON significantly fewer samples (e.g., 8000 vs. 30000) are required to achieve good matching.

Figure 2C:
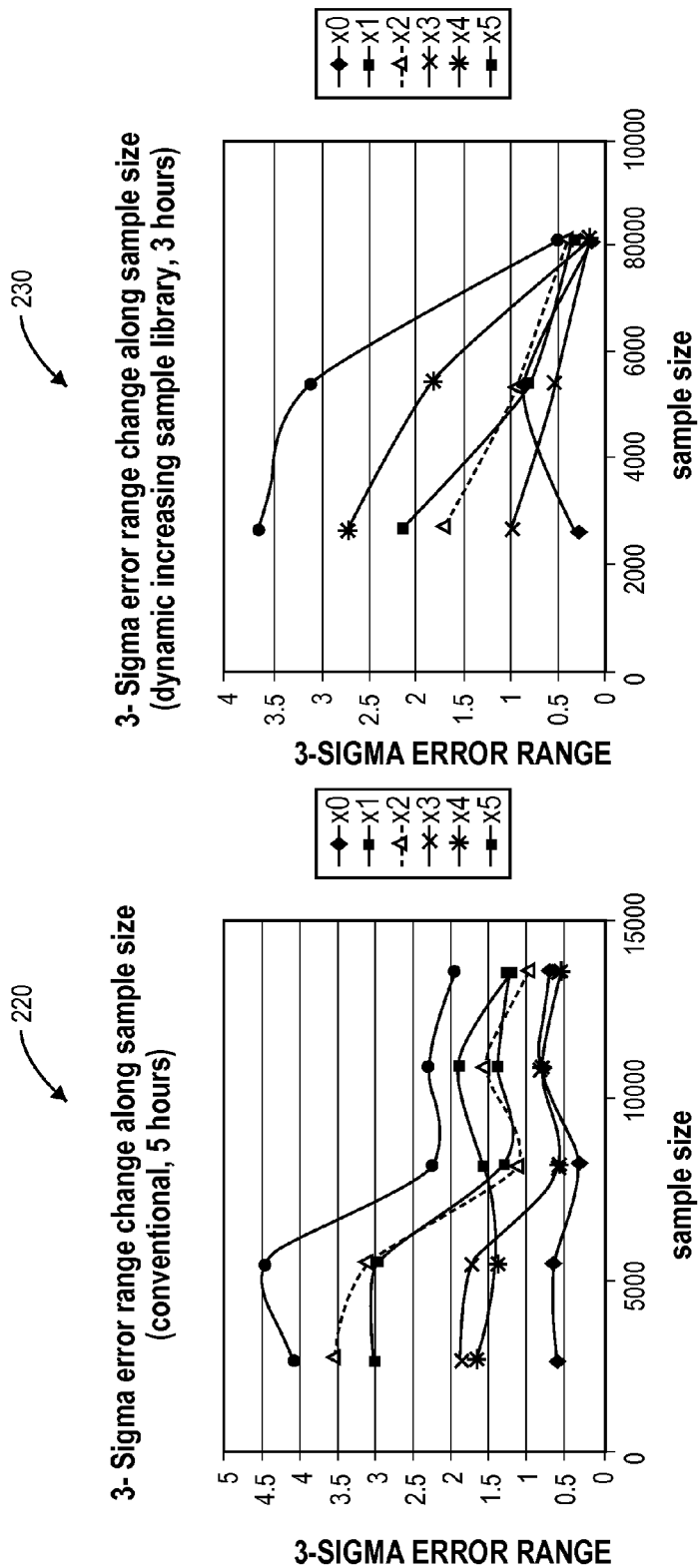
FIG. 2C includes a pair of plots of a 3-sigma error range as compared with conventional versus an increasing library sample size, in accordance with an embodiment of the present invention.

FIG. 2C includes a pair of plots 220 and 230 of a 3-sigma error range as compared with increasing library sample size, in accordance with an embodiment of the present invention. Referring to FIG. 2C, a 3-sigma error range changes in response to sample size (e.g. dynamic increasing sample library approach OFF, 5 hours, conventional approach; versus dynamic increasing sample library approach ON, 3 hours, in an embodiment of the present invention). Thus, using a dynamic increasing sample library approach, the time to achieve a desired result may be significantly reduced.

In an embodiment, referring again to flowchart 100, the high accuracy spectral library includes a simulated spectrum, and the method described in association with flowchart 100 further includes an operation of comparing the simulated spectrum to a sample spectrum. In one embodiment, the simulated spectrum is obtained from a set of spatial harmonics orders. In one embodiment, the sample spectrum is collected from a structure such as, but not limited to, a physical reference sample or a physical production sample. In an embodiment, the comparison is performed by using a regression calculation. In one embodiment, one or more non-differential signals are used simultaneously in the calculation. The one or more non-differential signals may be one such as, but not limited to, azimuth angles, angles of incidence, polarizer/analyzer angles, or additional measurement targets.

Figure 3:
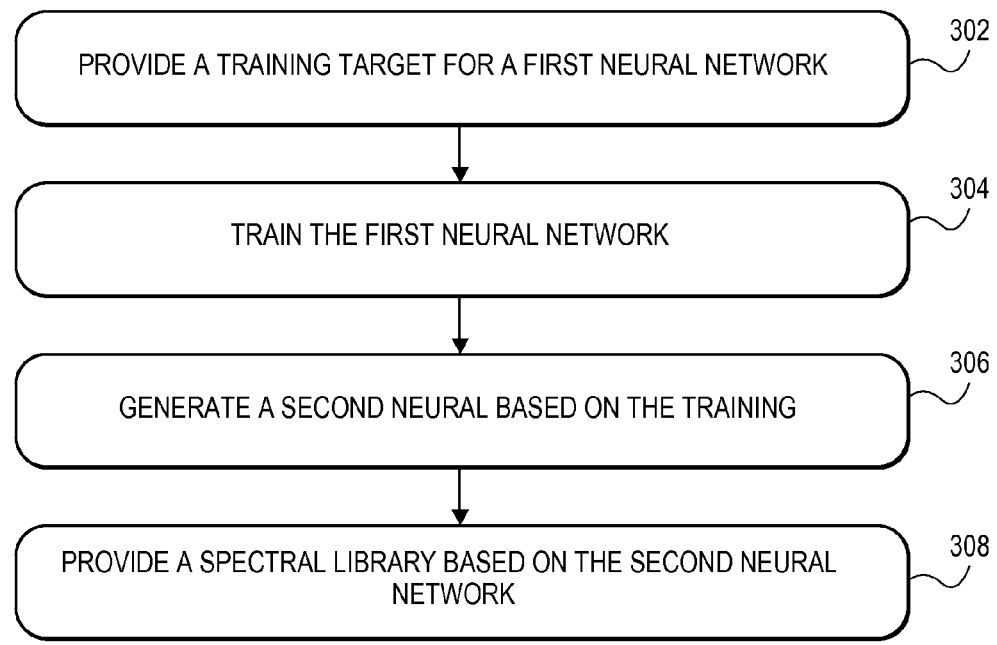
FIG. 3 depicts a flowchart representing an exemplary series of operations for fast neural network training for library-based CD metrology, in accordance with an embodiment of the present invention.

In another aspect of the present invention, a fast neural network training approach is provided. FIG. 3 depicts a flowchart 300 representing an exemplary series of operations for fast neural network training for library-based CD metrology, in accordance with an embodiment of the present invention. FIGS. 4A-4F further illustrate aspects of the method depicted in FIG. 3.

Referring to operation 302 of flowchart 300, a method includes providing a training target for a first neural network. Referring to operation 304 of flowchart 300, the first neural network is trained, the training including starting with a predetermined number of neurons and iteratively increasing the number of neurons until an optimized total number of neurons is reached. Referring to operation 306 of flowchart 300, a second neural network is generated based on the training and the optimized total number of neurons. It is to be understood that many such iterations may be performed in order to reach the optimized total number of neurons. Referring to operation 308 of flowchart 300, a spectral library is provided based on the second neural network.

In an embodiment, regarding "fast" training, a feed-forward neural network is used to implement a nonlinear mapping function F so that y≈F(p). The nonlinear mapping function F is used as a meta-model in determining a spectrum or spectra to associate with a given profile. The determining may be performed relatively quickly in regard to computational time and cost. In one embodiment, the function is determined in a training procedure with a set of training data $(p_i, y_i)$. A neural network may be used to approximate such an arbitrary nonlinear function. For example, FIG. 4A illustrates a two-hidden layer neural network, in accordance with an embodiment of the present invention.

Figure 4A:
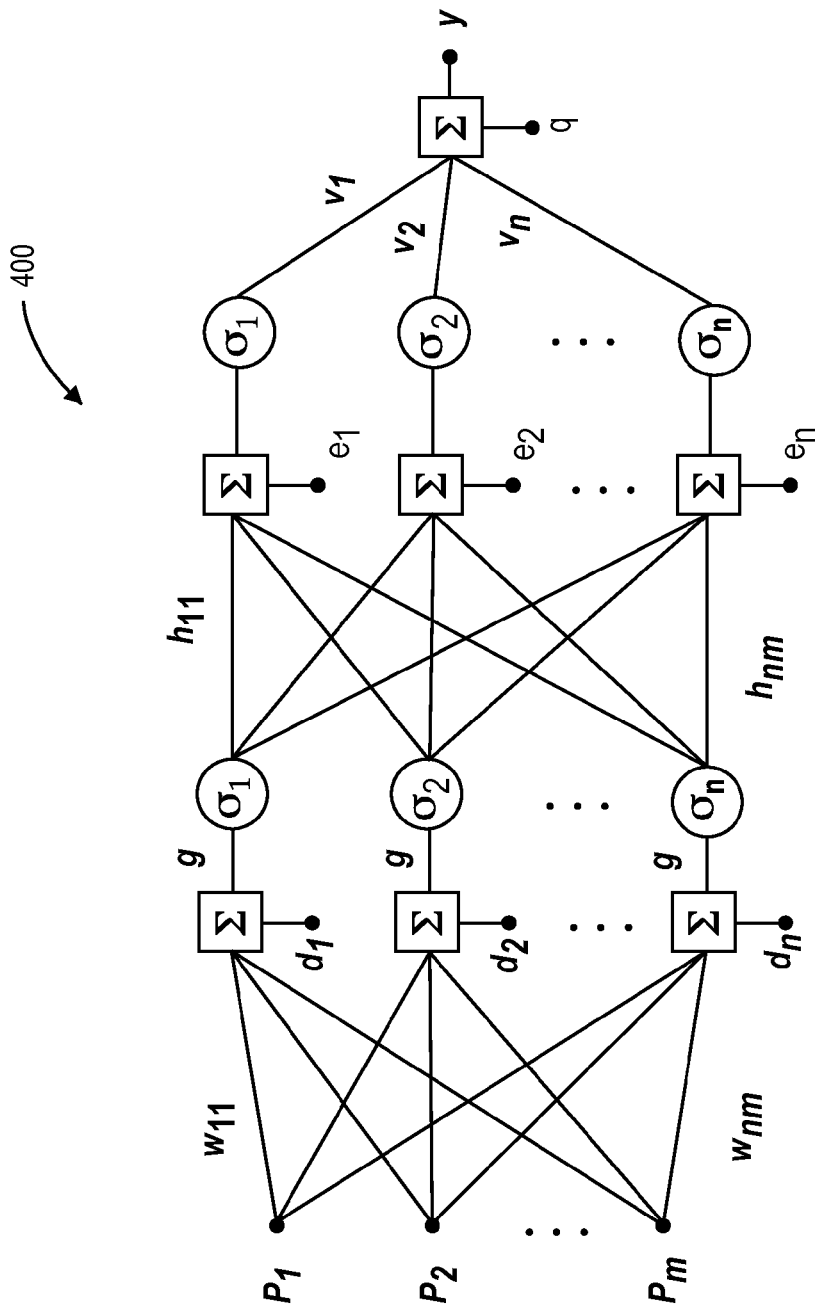
FIG. 4A illustrates a two-hidden layer neural network, in accordance with an embodiment of the present invention.

Referring to FIG. 4A, the true mapping function $F_{true}(p)$ from input p to output y can be approximated with the two-hidden layer neural network 400 in a mathematical way, according to eq. 1:

$$Y = F_{true}(p) \approx F(p) = v^T * G_1[h * G_2(W * p + d) + e] + q \quad (1)$$

where G1 and G2 are nonlinear functions. Given a set of training data $(p_i, y_i)$, finding out a set of W, h, d, e, $v^T$, and q that make F(p) best represents $F_{true}(p)$ is referred to as training. The training can be viewed as solving an optimization problem for minimizing the mean squared error, according to eq. 2:

$$Cost = \frac{1}{2N} \sum_{i=1}^{F} (y_i - F(p_i))^2 = \frac{1}{2N} E^T E \quad (2)$$

Follow-up questions or determinations include, (1) how many number of neurons in the hidden layers should be used?, and (2) how should the neural network be trained to have a prescribed accuracy?

Regarding a determination of the number of neurons, there are two methods to answer the first question above. The first method is a heuristic approach. The heuristic approach involves setting set two numbers, 18 and 30, for the minimal and maximal number of neurons to be used. When the number of principal components for the training data is smaller than or equals to 25, 18 neurons are used. When the number of principal components is larger than or equals to 80, 30 neurons are used. When the number of principal components falls in between, linear interpolation is used to decide on a suitable number of neurons. One potential issue with the heuristic approach may be that the number of principal components is unrelated to the number of neurons should be used.

The second method for determining an answer to the first question above is a method coupled with various training methods. First, the maximal number of neurons that can be used is estimated, e.g., denoting the number as Mmax. Then, the following iterative procedure is used to decide the number of neurons and train the corresponding network: set m=10, then (1) train a network with m neurons; if the approach converges, stop, otherwise (2) if (m+5) is larger than Mmax, stop, otherwise (3) increase m by 5, go to operation 1. The above method, however, can be very time-consuming.

Guessing the optimal number of neurons in a feed-forward neural network to fit a nonlinear function is an NP-complete problem (i.e., a class of problems that have no known solution with polynomial-time complexity). Thus, in accordance with an embodiment of the present invention, and as described in more detail below, a fast method of optimization includes gradually increasing the number of neurons in the network during the training until an optimized number of neurons is determined that will provide a specified accuracy.

With respect to an algorithmic description, in an embodiment, an incremental training algorithm is a composite method utilizing an algorithm to train a neural network. In one embodiment, a modified Levenberg-Marquardt algorithm is used. The original Levenberg-Marquardt algorithm for the problem is briefly described as follows: denote the Jacobian $$J = \frac{\delta F}{\delta W}$$

where w is element in W, h, d, e, $v^T$, and q for a neural network. Evaluate J and find δw at iteration i so that:

$$(J^T J + \mu I)\delta w = J^T E,$$

where I is an identity matrix and μ is a scaling constant adjusted in every iteration. Update w by $w^{i+1} = w^i + \delta w$. Evaluate the cost with the new w's; if the cost is less than a prescribed value (e.g. $10^{-5}$), stop. Otherwise, continue the next iteration until the number of iterations is larger than a prescribed number (e.g., 200). In other words, there are two possible cases that the algorithm will stop iterating. The first is that the cost function is less than a prescribed value. The second is that the number of iterations is larger than the maximal number of iterations. One observation is that the Levenberg-Marquardt algorithm is very effective in reducing the cost (mean squared value) in the first 10's of iterations. After that, the reduction rate slows down significantly.

Instead, in an embodiment, the modification of the above Levenberg-Marquardt algorithm for application herein is made at the stopping criteria. That is, one more criterion is added: if the cost does not reduce by x % compared with the cost of the previous iteration for 'r' consecutive iterations, stop. The additional criterion is performed to detect under-fitting. The incremental training algorithm is then presented: a given training set $(p_i, y_i)$ in provided as input and a number of neurons n, the weights of the 2-hidden layer network, is provided as output. From there, the following operations are executed: (1) the maximal number of neurons is estimated, e.g., denoted Nmax, (2) the number of neurons n is set to be 4, (3) the Nguyen-Widrow algorithm is used to initialize the weight w's, (4) while (n<Nmax), (a) the network is trained using the modified Levenberg-Marquardt approach, (b) if cost is less than a prescribed value, the determination is stopped, (c) if cost does not reduce by x % compared with the previous cost with 'r' consecutive trials, the determination is stopped, (d) optionally, a validation data set is used: if the error of validation data increases for t consecutive trials, the determination is stopped, (e) n is set to n+2, and the new neural network is constructed by using the trained weights in the old neural network. Random numbers are then assigned to new weights, and operations 4a-e are repeated.

It is to be understood that the modification of Levenberg-Marquardt may be important for fast training approaches. The modification may permit that the algorithm stops when reduction rate is small and increases the number of neurons instead. Namely, modification amounts to detection underfitting. In practice, in one embodiment, x=10 and r=4 are found to be a good selection. Algorithms other than Levenberg-Marquardt can be used, provided that the modification is done properly. Regarding the operation, 4e, the operation permits the search to jump out of a local minima that are often led to by those gradient-based optimization algorithms, such as Levenberg-Marquardt. The Levenberg-Marquardt approach provides a good set of starting values for weights. Operations 4c and 4d above are methods to prevent over-training with larger number of neurons.

In an embodiment, a further extension of the incremental algorithm can be implemented as follows, assuming for simplicity that the raw data is trained, which includes Mueller elements of different profiles, instead of the principal components. The further extension can be described in the following set of operations: (1) given a set of profiles, say Np, a neural network is trained using the above new algorithm to represent the nonlinear mapping from a profile to one Mueller element, (2) an Np+=δNp approach is used to train the network defined with Np profiles, (a) if the Np+=δNp approach stagnates, the number of neurons is increased to more accurately represent the nonlinear mapping, (b) if the Np+=δNp approach converges, the current network is used, (3) the accuracy of the current neural network model is evaluated for the nonlinear mapping, (a) if the desired accuracy is satisfied, the method is stopped here, (b) otherwise, the number of profiles is increased by δNp, and the method includes reverting again to operation 2.

Figure 4B:
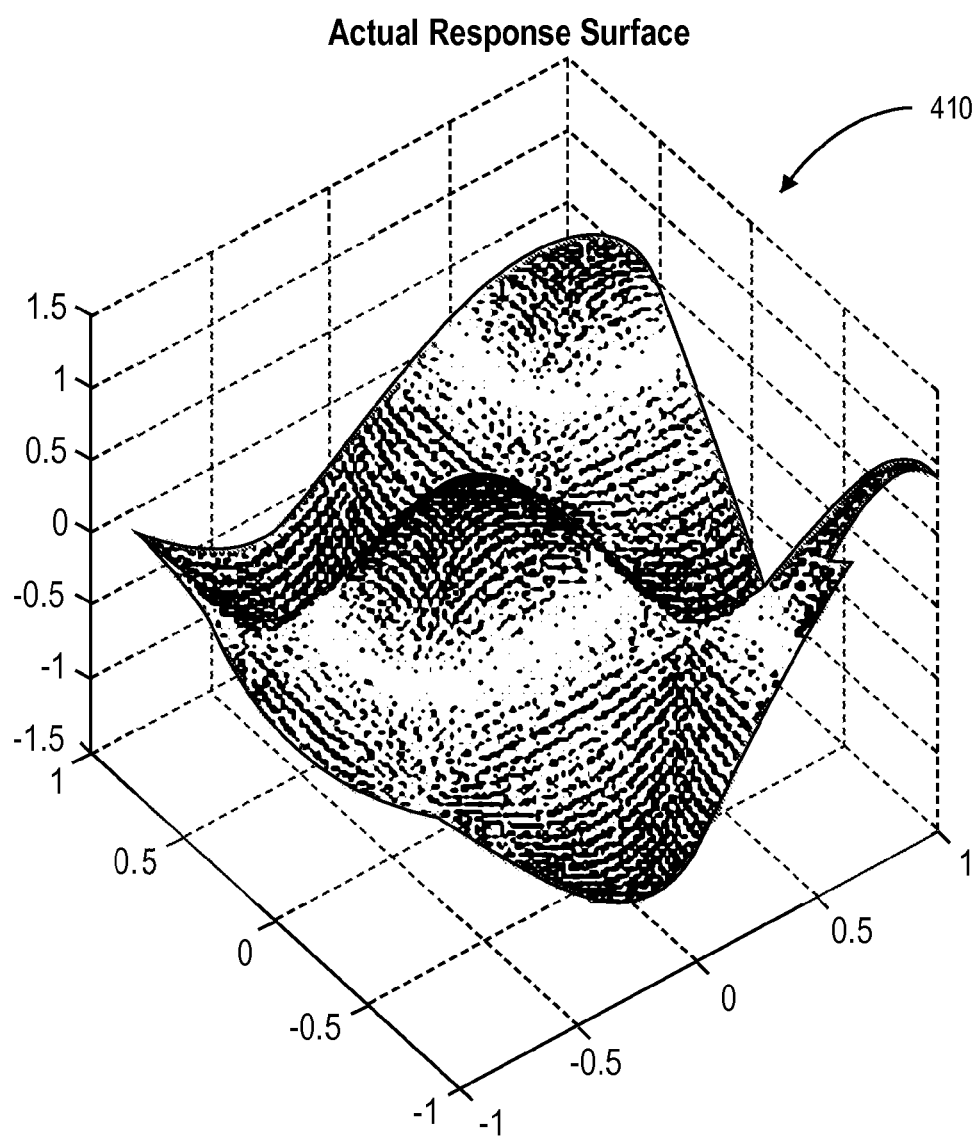
FIG. 4B illustrates a Matlab plot of an actual response surface for a fast neural network training for library-based CD metrology, in accordance with an embodiment of the present invention.

FIG. 4B illustrates a Matlab plot 410 of an actual response surface for a fast neural network training for library-based CD metrology, in accordance with an embodiment of the present invention. Referring to FIG. 4B, a function with two unknowns is used to generate 1000 training samples along with 100 validation samples using Halton quasi-random number generator.

Figure 4C:
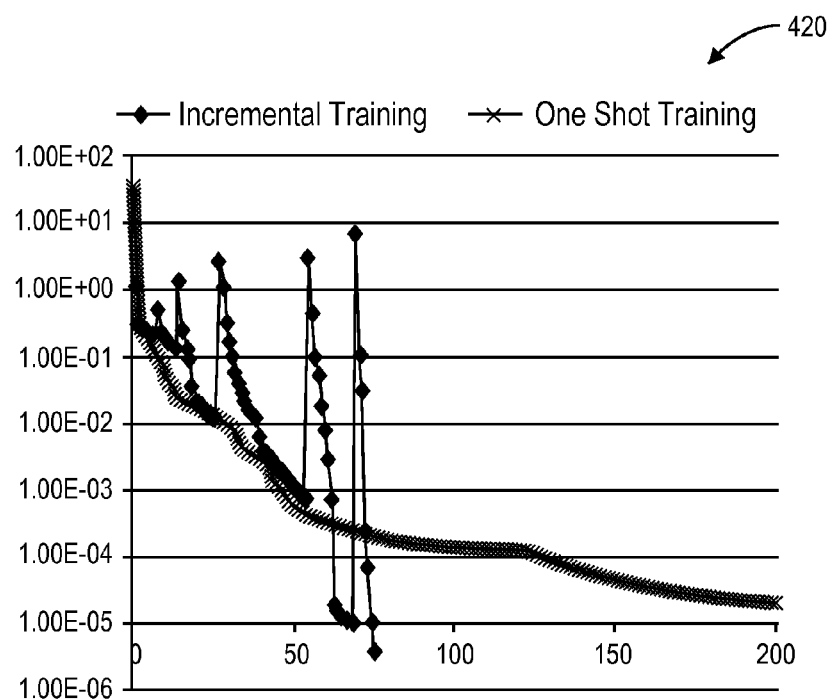
FIG. 4C is a plot comparing convergence history of the incremental algorithm and the one-shot Levenberg-Marquardt algorithm, in accordance with an embodiment of the present invention.

FIG. 4C is a plot 420 comparing convergence history of the incremental algorithm and the one-shot Levenberg-Marquardt algorithm, in accordance with an embodiment of the present invention. Referring to FIG. 4C, the convergence history of the incremental training algorithm is compared with original Levenberg-Marquardt algorithm (tagged as one-shot method since the method provides one-shot training with an estimated number of neurons, e.g., 12 neurons in each hidden layer). The incremental training portion of plot 420 exhibits spikes because of operations in 4e, but the algorithm is very effective in reducing the cost back to previous level. The one-shot method stagnates and does not converge within 200 iterations. The computational complexity of one iteration of the Levenberg-Marquardt is $O(n^6)$, where n is the number of neurons in the two-hidden layer network. For the incremental algorithm, the execution time is dominated by the training of the last value of the number of neurons. Thus, the performance of incremental algorithm projected may be an order magnitude better than one-shot method by comparing with the number of iterations in the last stage of the incremental training and the number of iterations used in the one-shot method.

Figure 4D:
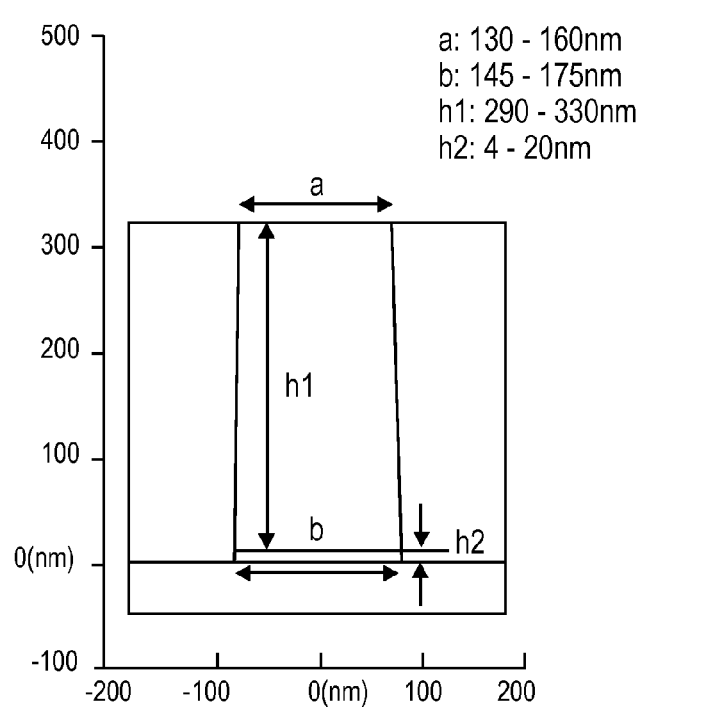
FIG. 4D is a plot illustrating a performance comparison for a fast neural network training for library-based CD metrology, in accordance with an embodiment of the present invention.

FIG. 4D is a plot 430 illustrating a performance comparison for a fast neural network training for library-based CD metrology, in accordance with an embodiment of the present invention. Referring to FIG. 4D, in a two-dimensional testing example there are four degrees of freedom, one for the top dimension, one for the bottom dimension, and two for the heights. The ranges of those parameters are also shown. Automatic truncation order is used for RCWA simulation. There are 251 wavelengths. A dynamic increasing sample library approach is enabled and there were more than 14,000 profiles generated in order to create a library.

Figure 4E:
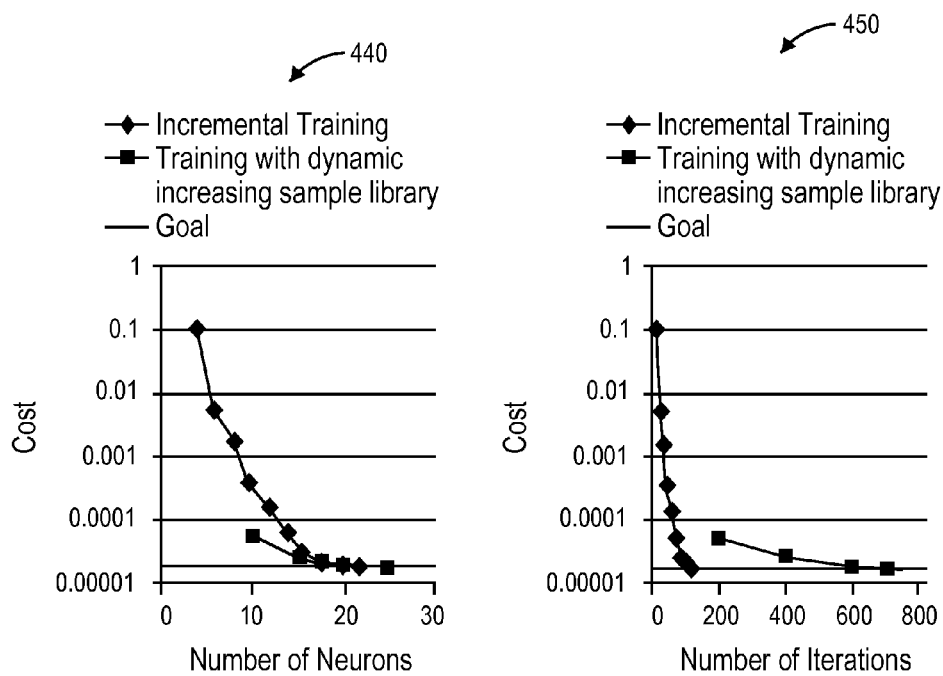
FIG. 4E includes a pair of plots comparing the results for one spectrum for a fast neural network training for library-based CD metrology, in accordance with an embodiment of the present invention.

FIG. 4E includes a pair of plots 440 and 450 comparing the results for one spectrum for a fast neural network training for library-based CD metrology, in accordance with an embodiment of the present invention. Referring to FIG. 4E, only the cost values at the end of each stage were plotted, for the purpose of clarity. With incremental training, the application converged with 127 total iterations and the final number of neurons was 22. Note that there were only 7 iterations at the last stage, which is the dominating portion. With training algorithm using a dynamic increasing sample library, the approach converged with 712 iterations and the final number of neurons was 25. Note that the approach utilized 111 iterations at the last stage.

Figure 4F:
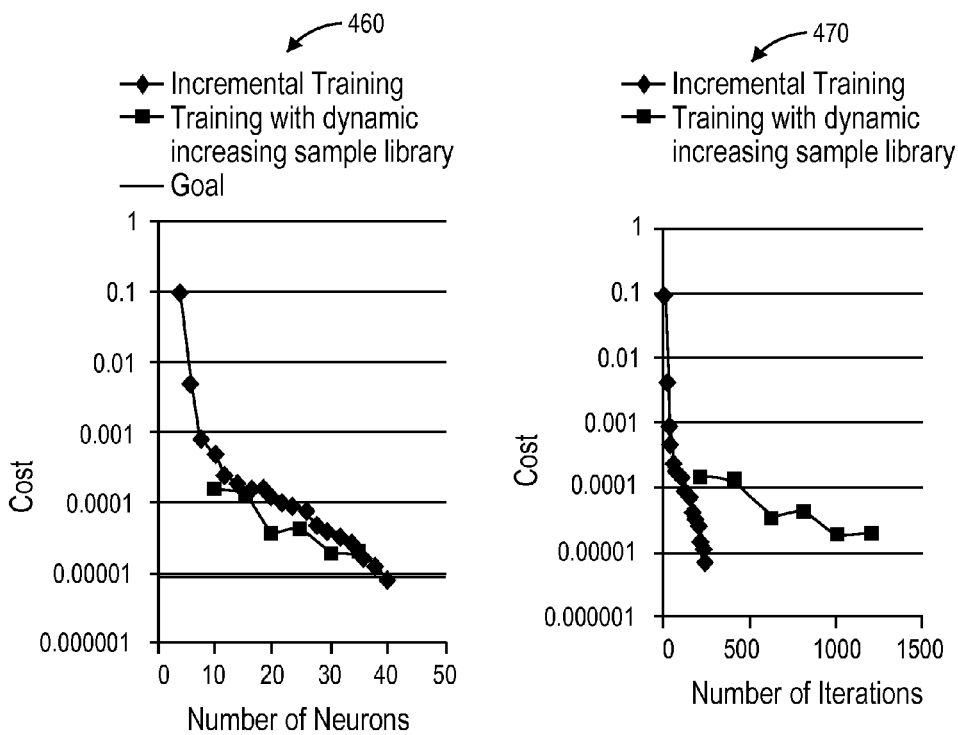
FIG. 4F includes a pair of plots comparing the results for a second spectrum for a fast neural network training for library-based CD metrology, in accordance with an embodiment of the present invention.

FIG. 4F includes a pair of plots 460 and 470 comparing the results for a second spectrum for a fast neural network training for library-based CD metrology, in accordance with an embodiment of the present invention. Referring to FIG. 4F, results for another spectrum in the same testing example as FIG. 4E are presented. With incremental training, the approach required 240 total iterations for a final number of neurons of 40, where the last stage only used 9 iterations. With the conventional training method, the approach did not converge after 1200 iterations.

More generally, pertaining at least to some embodiments of the present invention, a new training method has been found for neural networks. During the execution of the algorithm, an optimized number of neurons for the hidden layers is determined. The algorithm can be an order of magnitude faster than one-shot Levenberg-Marquardt especially if one can estimate the correct number of neurons. The algorithm may be orders of magnitude faster than conventional approaches. In one embodiment, an optimized number of neurons in the hidden layer is determined. In one embodiment, the above approach trains the network in very fast way.

In an embodiment, referring again to flowchart 300, the spectral library generated includes a simulated spectrum, and the method described in association with flowchart 300 further includes an operation of comparing the simulated spectrum to a sample spectrum. In one embodiment, the simulated spectrum is obtained from a set of spatial harmonics orders. In one embodiment, the sample spectrum is collected from a structure such as, but not limited to, a physical reference sample or a physical production sample. In an embodiment, the comparison is performed by using a regression calculation. In one embodiment, one or more non-differential signals are used simultaneously in the calculation. The one or more non-differential signals may be one such as, but not limited to, azimuth angles, angles of incidence, polarizer/analyzer angles, or additional measurement targets.

Any suitable neural network may be used to perform one or more approaches described in association with flowcharts 100 and 300. As an example, FIG. 5 depicts select elements of an exemplary neural network for generating a library of spectral information, in accordance with an embodiment of the present invention.

Figure 5:
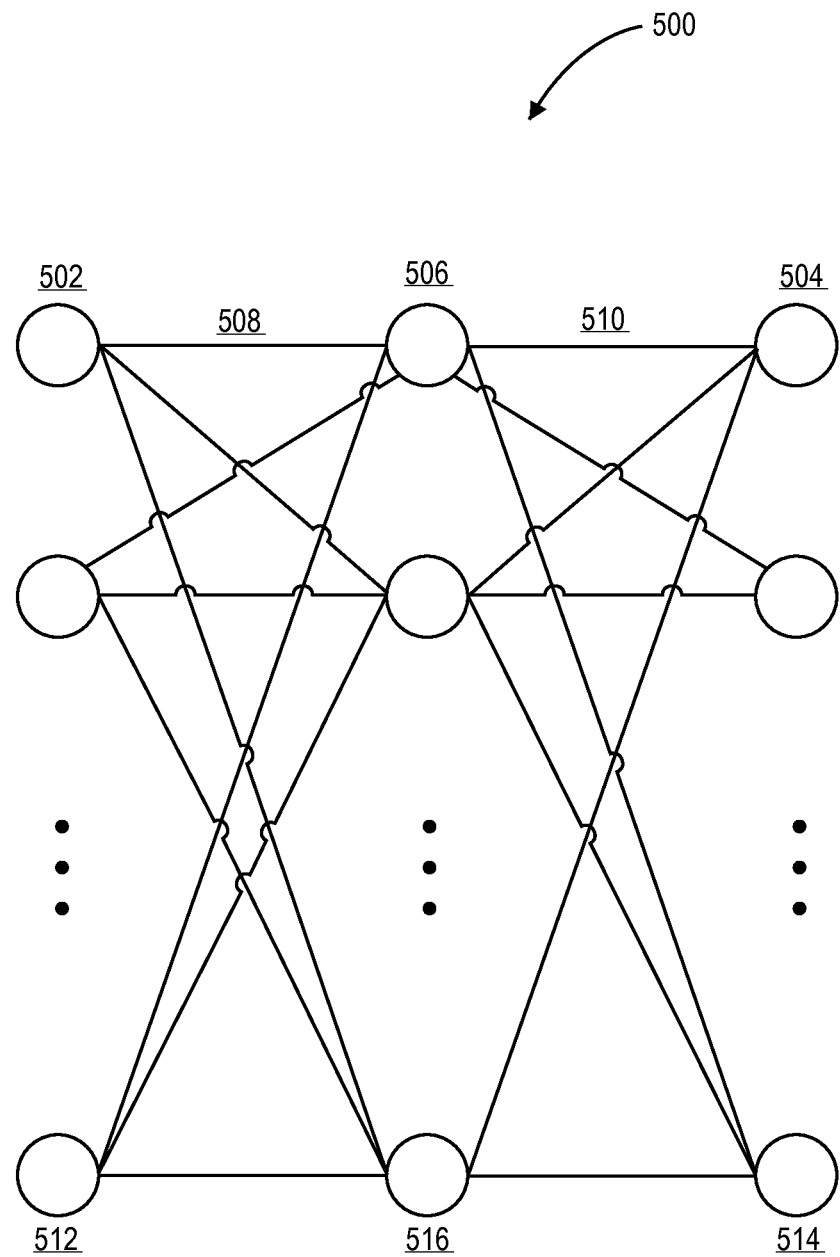
FIG. 5 depicts select elements of an exemplary neural network for generating a library of spectral information, in accordance with an embodiment of the present invention.

Referring to FIG. 5, a neural network 500 uses a back-propagation algorithm. Neural network 500 includes an input layer 502, an output layer 504, and a hidden layer 506 between input layer 502 and output layer 504. Input layer 502 and hidden layer 506 are connected using links 508. Hidden layer 506 and output layer 504 are connected using links 510. It should be recognized, however, that neural network 500 can include any number of layers connected in various configurations commonly known in the neural network art.

As depicted in FIG. 5, input layer 502 includes one or more input nodes 512. In the present exemplary implementation, an input node 512 in input layer 502 corresponds to a profile parameter of the profile model that is inputted into neural network 500. Thus, the number of input nodes 512 corresponds to the number of profile parameters used to characterize the profile model. For example, if a profile model is characterized using two profile parameters (e.g., top and bottom critical dimensions), input layer 502 includes two input nodes 512, where a first input node 512 corresponds to a first profile parameter (e.g., a top critical dimension) and a second input node 512 corresponds to a second profile parameter (e.g., a bottom critical dimension).

In neural network 500, output layer 504 includes one or more output nodes 514. In the present exemplary implementation, each output node 514 is a linear function. It should be recognized, however, that each output node 514 can be various types of functions. Additionally, in the present exemplary implementation, an output node 514 in output layer 504 corresponds to a dimension of the simulated diffraction signal that is outputted from neural network 500. Thus, the number of output nodes 514 corresponds to the number of dimensions used to characterize the simulated diffraction signal. For example, if a simulated diffraction signal is characterized using five dimensions corresponding to, for example, five different wavelengths, output layer 504 includes five output nodes 514, wherein a first output node 514 corresponds to a first dimension (e.g., a first wavelength), a second output node 514 corresponds to a second dimension (e.g., a second wavelength), etc. Additionally, for increased performance, neural network 500 can be separated into a plurality of sub networks based on separate components of the simulated diffraction signal and/or dimensions of the components of the simulated diffraction signal.

In neural network 500, hidden layer 506 includes one or more hidden nodes 516. In the present exemplary implementation, each hidden node 516 is a sigmoidal transfer function or a radial basis function. It should be recognized, however, that each hidden node 516 can be various types of functions. Additionally, in the present exemplary implementation, the number of hidden nodes 516 is determined based on the number of output nodes 514. More particularly, the number of hidden nodes $516(m)$ is related to the number of output nodes $514(n)$ by a predetermined ratio (r=m/n). For example, when r=10, there are 10 hidden nodes 516 for each output node 514. It should be recognized, however, that the predetermined ratio can be a ratio of the number of output nodes 514 to the number of hidden nodes 516 (i.e., r=n/m). Additionally, it should be recognized that the number of hidden nodes 516 in neural network 500 can be adjusted after the initial number of hidden nodes 516 is determined based on the predetermined ratio. Furthermore, the number of hidden nodes 516 in neural network 500 can be determined based on experience and/or experimentation rather than based on the predetermined ratio.

Figure 6A:
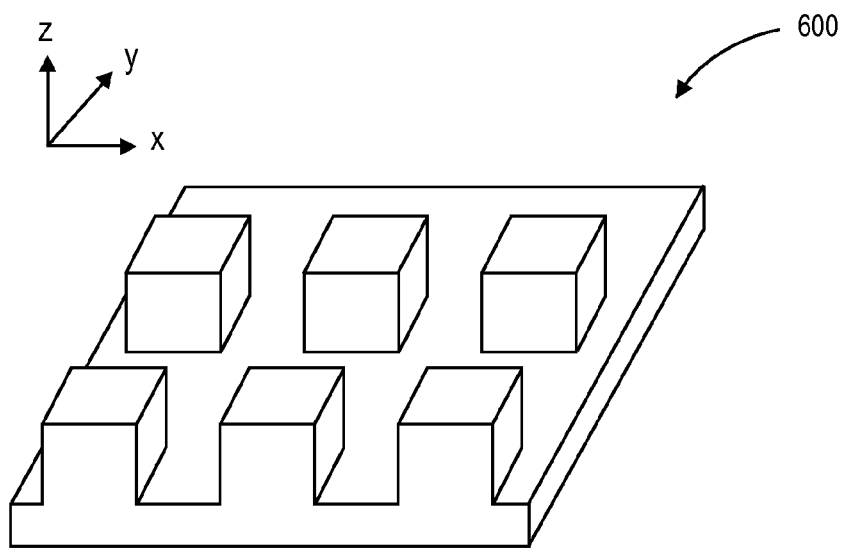
FIG. 6A depicts a periodic grating having a profile that varies in the x-y plane, in accordance with an embodiment of the present invention.

Libraries described above described above may include, in an embodiment, one or more parameters of an individual feature of a two-dimensional or three-dimensional grating structure. The term "three-dimensional grating structure" is used herein to refer to a structure having an x-y profile that varies in two dimensions in addition to a depth in the z-direction. For example, FIG. 6A depicts a periodic grating 600 having a profile that varies in the x-y plane, in accordance with an embodiment of the present invention. The profile of the periodic grating varies in the z-direction as a function of the x-y profile.

Figure 6B:
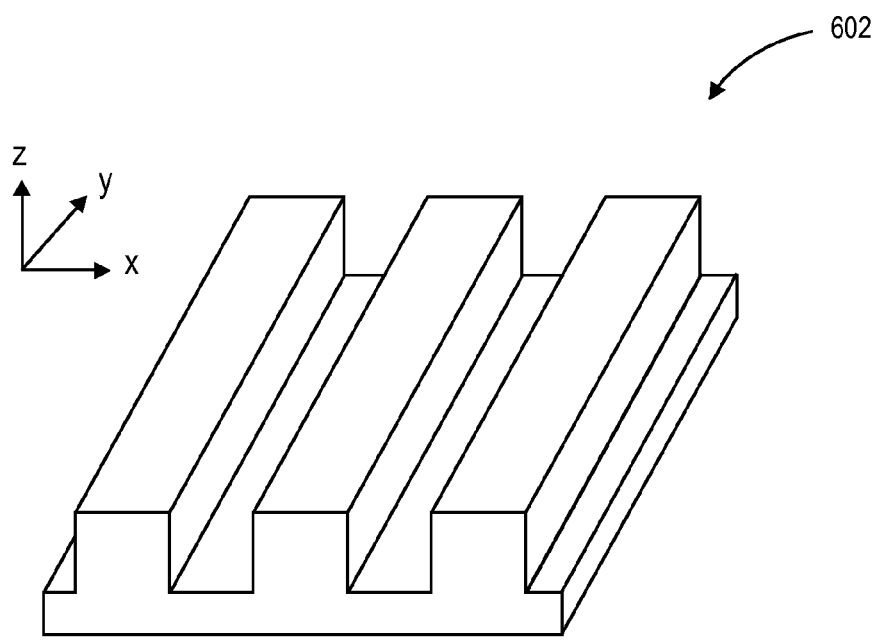
FIG. 6B depicts a periodic grating having a profile that varies in the x-direction but not in the y-direction, in accordance with an embodiment of the present invention.

The term "two-dimensional grating structure" is used herein to refer to a structure having an x-y profile that varies in only one dimension in addition to a depth in the z-direction. For example, FIG. 6B depicts a periodic grating 602 having a profile that varies in the x-direction but not in the y-direction, in accordance with an embodiment of the present invention. The profile of the periodic grating varies in the z-direction as a function of the x profile. It is to be understood that the lack of variation in the y-direction for a two-dimensional structure need not be infinite, but any breaks in the pattern are considered long range, e.g., any breaks in the pattern in the y-direction are spaced substantially further apart than the brakes in the pattern in the x-direction.

In an embodiment, where the individual feature is of a two-dimensional or three-dimensional grating structure, the first parameter is one such as, but not limited to, width, height, length, top corner rounding, bottom footing, or sidewall angle of the individual feature. Optical properties of materials, such as index of refractivity and coefficient of extinction, (n & k), in wafer structures may also be modeled for use in optical metrology.

Regarding the use of spectral libraries as provided from the methods of flowcharts 100 and 300, in an embodiment, one such method includes altering parameters of a process tool based on the agreement or non-agreement with simulated parameters in the spectral library. Altering the parameters of the process tool may be performed by using a technique such as, but not limited to, a feedback technique, a feed-forward technique, and an in situ control technique. In an embodiment, the spectral library can be used to more accurately set up a device structure profile and geometry in a CD metrology tool recipe. In an embodiment, the spectral library is used as a part of CD metrology tool validation, diagnostic and characterization.

As described above, use of a spectral library may include comparing a simulated spectrum to a sample spectrum. In one embodiment, a set of diffraction orders is simulated to represent diffraction signals generated by an ellipsometric optical metrology system from a two- or three-dimensional grating structure. Such an optical metrology system is described below in association with FIG. 9. However, it is to be understood that the same concepts and principles equally apply to the other optical metrology systems, such as reflectometric systems. The diffraction signals represented may account for features of the two- or three-dimensional grating structure such as, but not limited to, profile, dimensions or material composition.

Figure 7:
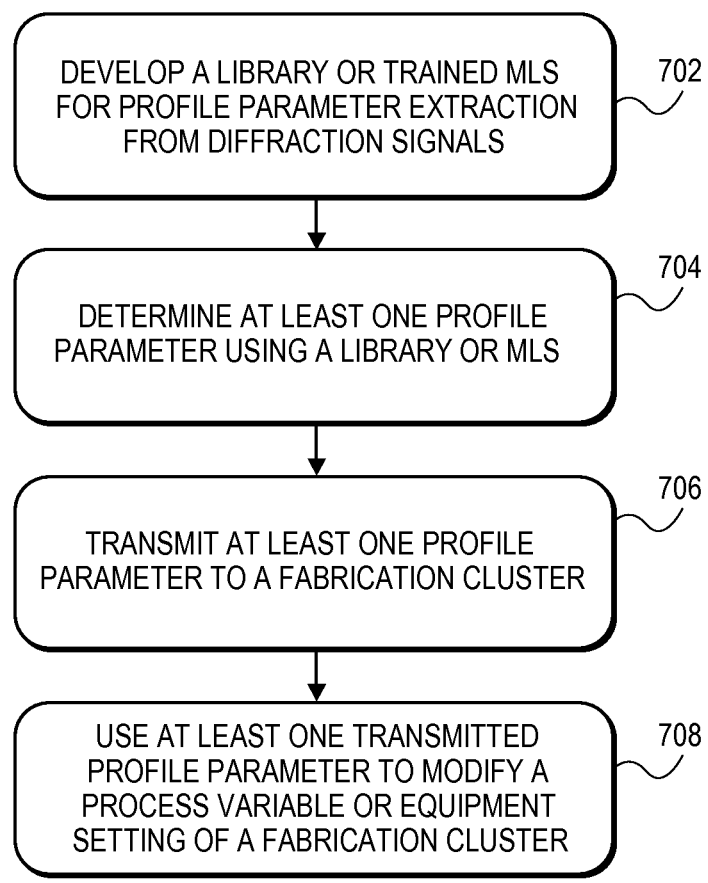
FIG. 7 depicts a flowchart representing an exemplary series of operations for determining and utilizing structural parameters for automated process and equipment control, in accordance with an embodiment of the present invention.

Calculations based simulated diffraction orders may be indicative of profile parameters for a patterned film, such as a patterned semiconductor film or photo-resist layer, and may be used for calibrating automated processes or equipment control. FIG. 7 depicts a flowchart 700 representing an exemplary series of operations for determining and utilizing structural parameters, such as profile parameters, for automated process and equipment control, in accordance with an embodiment of the present invention.

Referring to operation 702 of flowchart 700, a spectral library or trained machine learning systems (MLS) is developed to extract profile parameters from a set of measured diffraction signals. In operation 704, at least one profile parameter of a structure is determined using the spectral library or the trained MLS. In operation 706, the at least one profile parameter is transmitted to a fabrication cluster configured to perform a processing operation, where the processing operation may be executed in the semiconductor manufacturing process flow either before or after measurement operation 704 is made. In operation 708, the at least one transmitted profile parameter is used to modify a process variable or equipment setting for the processing operation performed by the fabrication cluster.

For a more detailed description of machine learning systems and algorithms, see U.S. Pat. No. 7,831,528, entitled OPTICAL METROLOGY OF STRUCTURES FORMED ON SEMICONDUCTOR WAFERS USING MACHINE LEARNING SYSTEMS, filed on Jun. 27, 2003, which is incorporated herein by reference in its entirety. For a description of diffraction order optimization for two dimensional repeating structures, see U.S. Pat. No. 7,428,060, entitled OPTIMIZATION OF DIFFRACTION ORDER SELECTION FOR TWO-DIMENSIONAL STRUCTURES, filed on Mar. 24, 2006, which is incorporated herein by reference in its entirety.

Figure 8:
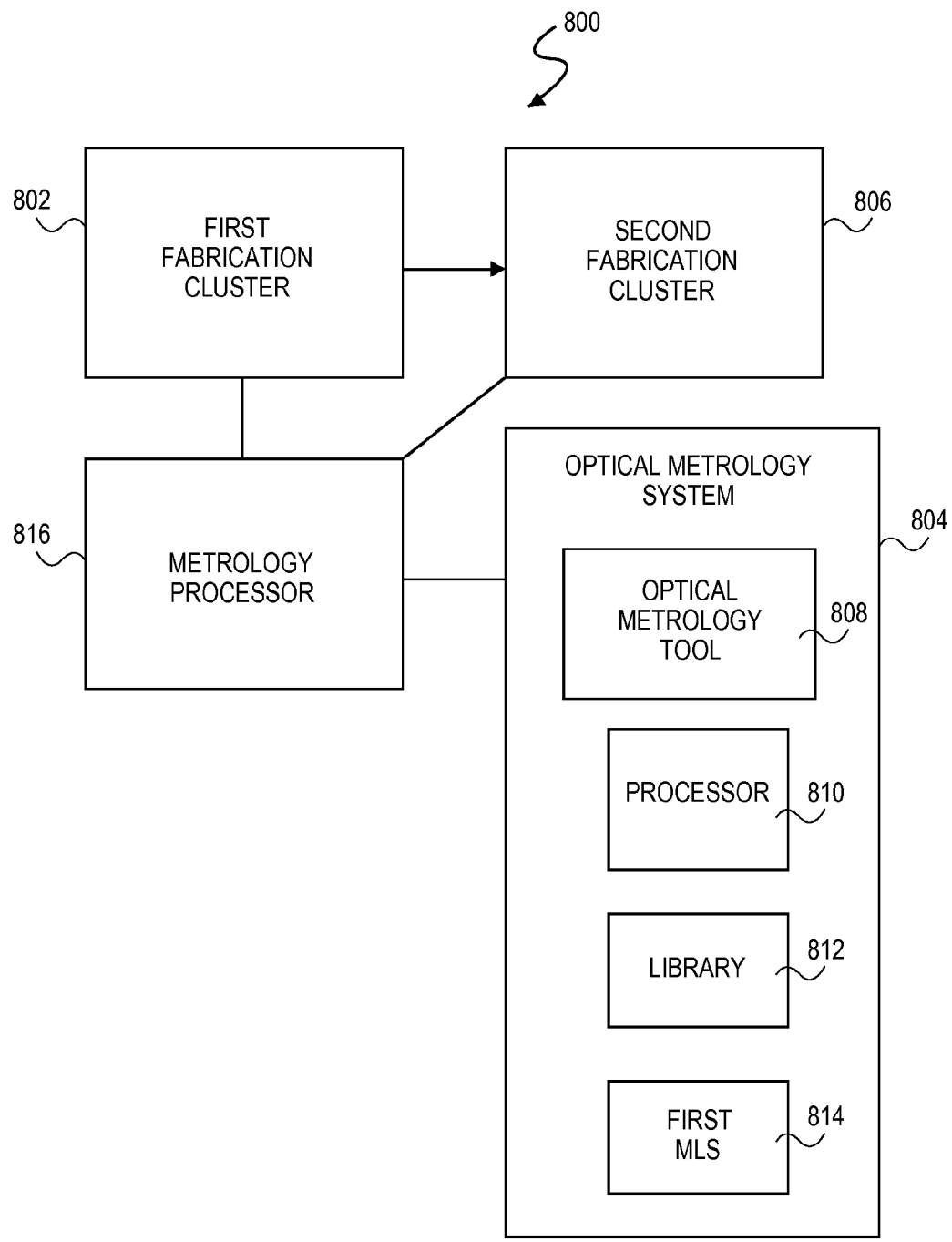
FIG. 8 is an exemplary block diagram of a system for determining and utilizing structural parameters for automated process and equipment control, in accordance with an embodiment of the present invention.

FIG. 8 is an exemplary block diagram of a system 800 for determining and utilizing structural parameters, such as profile parameters, for automated process and equipment control, in accordance with an embodiment of the present invention. System 800 includes a first fabrication cluster 802 and optical metrology system 804. System 800 also includes a second fabrication cluster 806. Although the second fabrication cluster 806 is depicted in FIG. 8 as being subsequent to first fabrication cluster 802, it should be recognized that second fabrication cluster 806 can be located prior to first fabrication cluster 802 in system 800 (and, e.g., in the manufacturing process flow).

A photolithographic process, such as exposing and developing a photo-resist layer applied to a wafer, can be performed using first fabrication cluster 802. In one exemplary embodiment, optical metrology system 804 includes an optical metrology tool 808 and processor 810. Optical metrology tool 808 is configured to measure a diffraction signal obtained from the structure. If the measured diffraction signal and the simulated diffraction signal match, one or more values of the profile parameters are determined to be the one or more values of the profile parameters associated with the simulated diffraction signal.

In one exemplary embodiment, optical metrology system 804 can also include a spectral library 812 with a plurality of simulated diffraction signals and a plurality of values of one or more profile parameters associated with the plurality of simulated diffraction signals. As described above, the spectral library can be generated in advance. Metrology processor 810 can compare a measured diffraction signal obtained from a structure to the plurality of simulated diffraction signals in the spectral library. When a matching simulated diffraction signal is found, the one or more values of the profile parameters associated with the matching simulated diffraction signal in the spectral library is assumed to be the one or more values of the profile parameters used in the wafer application to fabricate the structure.

System 800 also includes a metrology processor 816. In one exemplary embodiment, processor 810 can transmit the one or more values of the one or more profile parameters to metrology processor 816. Metrology processor 816 can then adjust one or more process parameters or equipment settings of first fabrication cluster 802 based on the one or more values of the one or more profile parameters determined using optical metrology system 804. Metrology processor 816 can also adjust one or more process parameters or equipment settings of the second fabrication cluster 806 based on the one or more values of the one or more profile parameters determined using optical metrology system 804. As noted above, fabrication cluster 806 can process the wafer before or after fabrication cluster 802. In another exemplary embodiment, processor 810 is configured to train machine learning system 814 using the set of measured diffraction signals as inputs to machine learning system 814 and profile parameters as the expected outputs of machine learning system 814.

Figure 9:
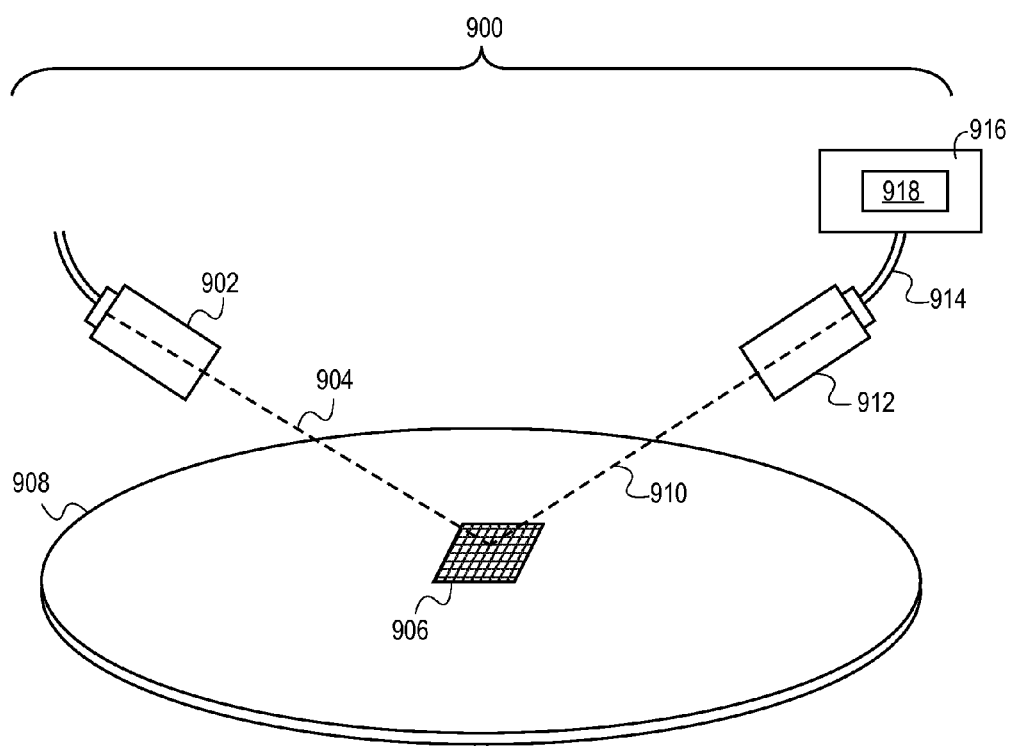
FIG. 9 is an architectural diagram illustrating the utilization of optical metrology to determine the profiles of structures on a semiconductor wafer, in accordance with an embodiment of the present invention.

FIG. 9 is an architectural diagram illustrating the utilization of optical metrology to determine the profiles of structures on a semiconductor wafer, in accordance with embodiments of the present invention. The optical metrology system 900 includes a metrology beam source 902 projecting a metrology beam 904 at the target structure 906 of a wafer 908. The metrology beam 904 is projected at an incidence angle θ towards the target structure 906. The diffraction beam 910 is measured by a metrology beam receiver 912. The diffraction beam data 914 is transmitted to a profile application server 916. The profile application server 916 compares the measured diffraction beam data 914 against a spectral library 918 of simulated diffraction beam data representing varying combinations of critical dimensions of the target structure and resolution.

In accordance with an embodiment of the present invention, at least a portion of the simulated diffraction beam data is based on a difference determined for two or more azimuth angles. In accordance with another embodiment of the present invention, at least a portion of the simulated diffraction beam data is based on a difference determined for two or more angles of incidence. In one exemplary embodiment, the spectral library 918 instance best matching the measured diffraction beam data 914 is selected. It is to be understood that although a spectral library of diffraction spectra or signals and associated hypothetical profiles is frequently used to illustrate concepts and principles, the present invention applies equally to a spectral data space including simulated diffraction signals and associated sets of profile parameters, such as in regression, neural network, and similar methods used for profile extraction. The hypothetical profile and associated critical dimensions of the selected spectral library 916 instance is assumed to correspond to the actual cross-sectional profile and critical dimensions of the features of the target structure 906. The optical metrology system 900 may utilize a reflectometer, an ellipsometer, or other optical metrology device to measure the diffraction beam or signal.

The set of profile models stored in spectral library 918 can be generated by characterizing a profile model using a set of profile parameters and then varying the set of profile parameters to generate profile models of varying shapes and dimensions. The process of characterizing a profile model using a set of profile parameters is referred to as parameterizing. For example, assume that a profile model can be characterized by profile parameters h1 and w1 that define its height and width, respectively. Additional shapes and features of the profile model can be characterized by increasing the number of profile parameters. For example, the profile model can be characterized by profile parameters h1, w1, and w2 that define its height, bottom width, and top width, respectively. Note that the width of the profile model can be referred to as the critical dimension (CD). For example, profile parameters w1 and w2 can be described as defining the bottom CD and top CD, respectively, of the profile model. It should be recognized that various types of profile parameters can be used to characterize the profile model, including but not limited to angle of incidence (AOI), pitch, n & k, hardware parameters (e.g., polarizer angle).

As described above, the set of profile models stored in spectral library 918 can be generated by varying the profile parameters that characterize the profile model. For example, by varying profile parameters h1, w1, and w2, profile models of varying shapes and dimensions can be generated. Note that one, two, or all three profile parameters can be varied relative to one another. As such, the profile parameters of the profile model associated with a matching simulated diffraction signal can be used to determine a feature of the structure being examined. For example, a profile parameter of the profile model corresponding to a bottom CD can be used to determine the bottom CD of the structure being examined.

Embodiments of the present invention may be suitable for a variety of film stacks. For example, in an embodiment, a film stack includes a single layer or multiple layers. Also, in an embodiment, an analyzed or measured grating structure includes both a three-dimensional component and a two-dimensional component. For example, the efficiency of a computation based on simulated diffraction data may be optimized by taking advantage of the simpler contribution by the two-dimensional component to the over all structure and the diffraction data thereof.

In order to facilitate the description of embodiments of the present invention, an ellipsometric optical metrology system is used to illustrate the above concepts and principles. It is to be understood that the same concepts and principles apply equally to the other optical metrology systems, such as reflectometric systems. In a similar manner, a semiconductor wafer may be utilized to illustrate an application of the concept. Again, the methods and processes apply equally to other work pieces that have repeating structures. In an embodiment, the optical scatterometry is a technique such as, but not limited to, optical spectroscopic ellipsometry (SE), beam profile reflectometry (BPR), and enhanced ultraviolet reflectometry (eUVR).

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 10:
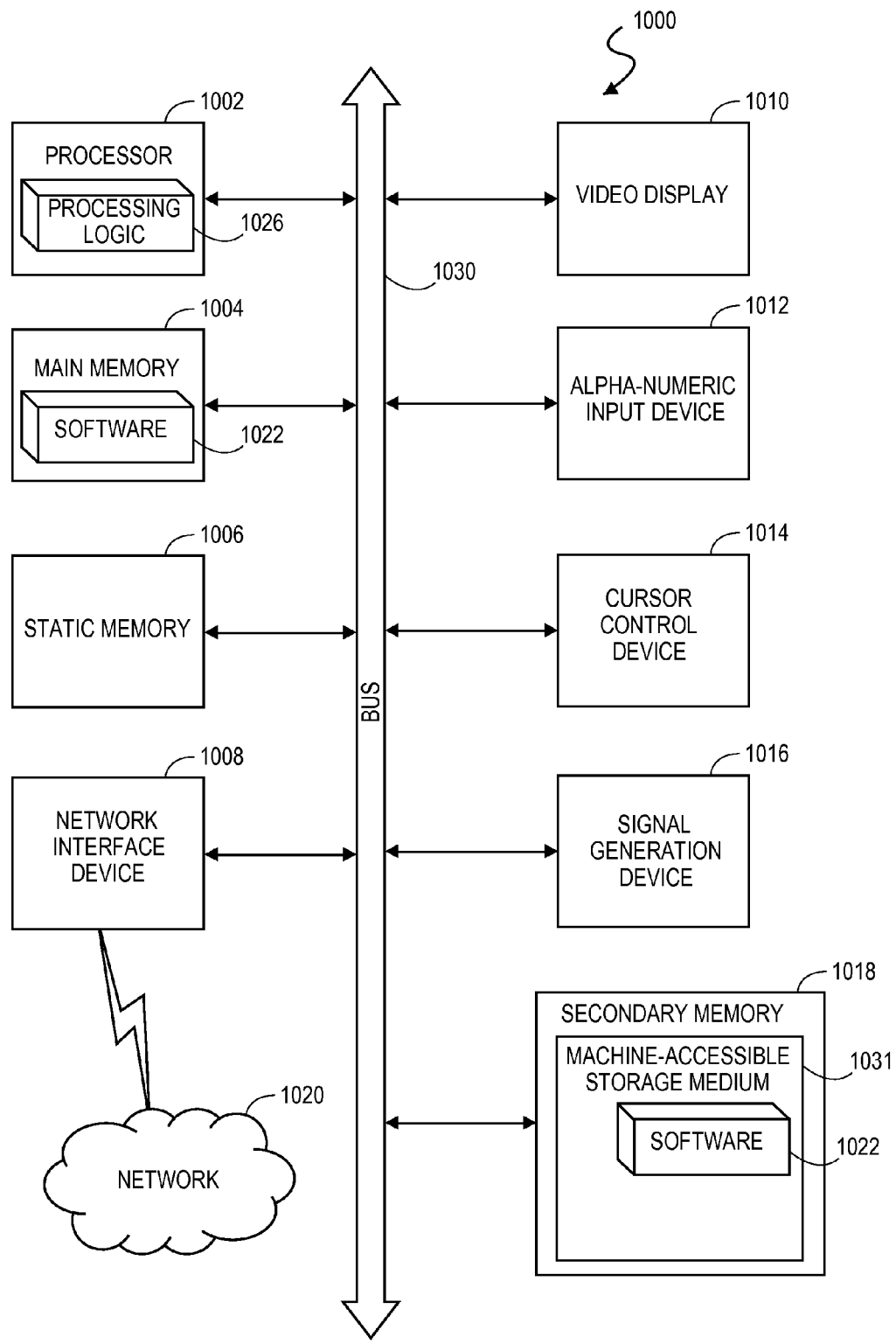
FIG. 10 illustrates a block diagram of an exemplary computer system, in accordance with an embodiment of the present invention.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1030.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 814 (e.g., a mouse), and a signal generation device 1016 (e.g., a speaker).

The secondary memory 1018 may include a machine-accessible storage medium (or more specifically a computer-readable storage medium) 1031 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface device 1008.

While the machine-accessible storage medium 1031 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

In accordance with an embodiment of the present invention, a machine-accessible storage medium has instructions stored thereon which cause a data processing system to perform a method of accurate neural network training for library-based CD metrology. The method includes optimizing a threshold for a principal component analysis (PCA) of a spectrum data set to provide a principal component (PC) value. A training target for one or more neural networks is estimated based on the PC value. The one or more neural networks are trained based on the training target and on the PC value. A spectral library is provided based on the one or more trained neural networks.

In an embodiment, optimizing the threshold for the PCA includes determining a lowest level spectrum domain.

In an embodiment, optimizing the threshold for the PCA includes determining a first PCA threshold, applying the PCA to a spectrum data set, calculating a spectrum error introduced by applying the PCA, and comparing the spectrum error to a spectrum noise level. In one such embodiment, if the spectrum error is less than the spectrum noise level, the first PCA threshold is set to the PC value. In another one such embodiment, if the spectrum error is greater than or equal to than the spectrum noise level, a second PCA threshold is determined, and the applying, the calculating, and the comparing is repeated.

In an embodiment, optimizing the threshold for the PCA includes using a Mueller domain error tolerance.

In an embodiment, the high accuracy spectral library includes a simulated spectrum, and the method further includes comparing the simulated spectrum to a sample spectrum.

In accordance with another embodiment of the present invention, a machine-accessible storage medium has instructions stored thereon which cause a data processing system to perform a method of fast neural network training for library-based CD metrology. The method includes providing a training target for a first neural network. The first neural network is trained. The training includes starting with a predetermined number of neurons and iteratively increasing the number of neurons until an optimized total number of neurons is reached. A second neural network is generated based on the training and the optimized total number of neurons. A spectral library is provided based on the second neural network.

In an embodiment, iteratively increasing the number of neurons until the optimized total number of neurons is reached includes using a modified Levenberg-Marquardt approach.

In an embodiment, iteratively increasing the number of neurons includes increasing the number of neurons in a hidden layer of the first neural network.

In an embodiment, the spectral library includes a simulated spectrum, and the method further includes comparing the simulated spectrum to a sample spectrum.

Figure 11:
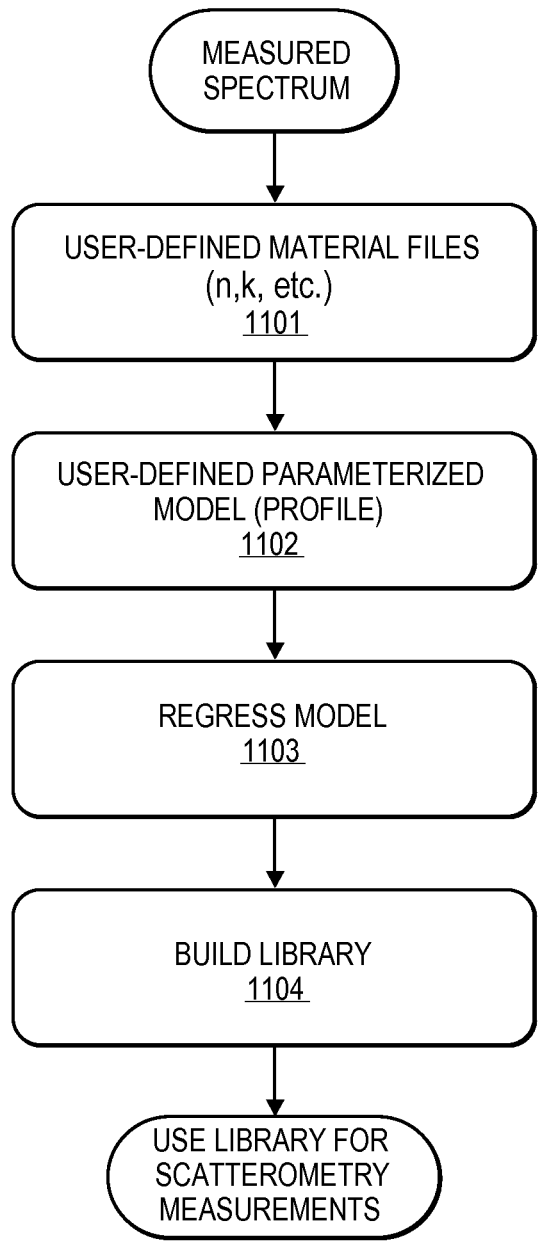
FIG. 11 is a flowchart representing operations in a method for a building parameterized model and a spectral library beginning with sample spectra, in accordance with an embodiment of the present invention.

Analysis of measured spectra generally involves comparing the measured sample spectra to simulated spectra to deduce a model's parameter values that best describe the measured sample. FIG. 11 is a flowchart 1100 representing operations in a method for a building parameterized model and a spectral library beginning with sample spectra (e.g., originating from one or more workpieces), in accordance with an embodiment of the present invention.

At operation 1101, a set of material files are defined by a user to specify characteristics (e.g., n, k values) of the material(s) from which the measured sample feature is formed.

At operation 1102, a scatterometry user defines a nominal model of the expected sample structure by selecting one or more of the material files to assemble a stack of materials corresponding to those present in the periodic grating features to be measured. Such a user-defined model may be further parameterized through definition of nominal values of model parameters, such as thicknesses, critical dimension (CD), sidewall angle (SWA), height (HT), edge roughness, corner rounding radius, etc. which characterize the shape of the feature being measured. Depending on whether a 2D model (i.e., a profile) or 3D model is defined, it is not uncommon to have 30-50, or more, such model parameters.

From a parameterized model, simulated spectra for a given set of grating parameter values may be computed using rigorous diffraction modeling algorithms, such as Rigorous Coupled Wave Analysis (RCWA). Regression analysis is then performed at operation 1103 until the parameterized model converges on a set of parameter values characterizing a final profile model (for 2D) that corresponds to a simulated spectrum which matches the measured diffraction spectra to a predefined matching criterion. The final profile model associated with the matching simulated diffraction signal is presumed to represent the actual profile of the structure from which the model was generated.

The matching simulated spectra and/or associated optimized profile model can then be utilized at operation 1104 to generate a library of simulated diffraction spectra by perturbing the values of the parameterized final profile model. The resulting library of simulated diffraction spectra may then be employed by a scatterometry measurement system operating in a production environment to determine whether subsequently measured grating structures have been fabricated according to specifications. Library generation 1104 may include a machine learning system, such as a neural network, generating simulated spectral information for each of a number of profiles, each profile including a set of one or more modeled profile parameters. In order to generate the library, the machine learning system itself may have to undergo some training based on a training data set of spectral information. Such training may be computationally intensive and/or may have to be repeated for different models and/or profile parameter domains. Considerable inefficiency in the computational load of generating a library may be introduced by a user's decisions regarding the size of a training data set. For example, selection of an overly large training data set may result in unnecessary computations for training while training with a training data set of insufficient size may necessitate a retraining to generate a library.

Some embodiments described herein include an automated determination of a training data set size to be used in training a machine learning system. Generally, the training data set is sized based on convergence of a data set characterization metric and may be further based on an estimate of the final solution error. The training data set is incrementally expanded and tested to identify convergence and, in certain embodiments, estimate the final solution error such a sample size will provide. The incremental expansion and testing is performed until convergence criteria are met and/or the estimate of final solution error meets a threshold.

Because the training matrix sizing methods described herein may not require a separate training, a good training data sample set for neural network training is identified quickly, efficiently, and with good control of the final solution error. With the training data sample set identified, a machine learning system may then be trained to generate the desired target function information. In one particular embodiment, the machine learning system is trained to generate a library of simulated spectral information (e.g., diffraction signals) which may be utilized to deduce parameters of an unknown sample (e.g., diffraction grating or a wafer periodic structure) measured with a scratterometry system.

It is to be understood that the above methodologies may be applied under a variety of circumstances within the spirit and scope of embodiments of the present invention. For example, in an embodiment, a method described above is performed in a semiconductor, solar, light-emitting diode (LED), or a related fabrication process. In an embodiment, a method described above is used in a stand-alone or an integrated metrology tool. In an embodiment, a method described above is used in single- or multiple-measurement target regressions.

Thus, approaches for accurate and fast neural network training for library-based CD metrology have been disclosed. In accordance with an embodiment of the present invention, a method of accurate neural network training for library-based CD metrology includes optimizing a threshold for a principal component analysis (PCA) of a spectrum data set to provide a principal component (PC) value. The method also includes estimating a training target for one or more neural networks. The method also includes training the one or more neural networks based on the PC value and the training target. The method also includes providing a spectral library based on the one or more trained neural networks. In one embodiment, optimizing the threshold for the PCA includes determining a lowest level spectrum domain. In accordance with an embodiment of the present invention, a method of fast neural network training for library-based CD metrology includes providing a training target for a first neural network. The method also includes training the first neural network, the training including starting with a predetermined number of neurons and iteratively increasing the number of neurons until an optimized total number of neurons is reached. The method also includes generating a second neural network based on the training and the optimized total number of neurons. The method also includes providing a spectral library based on the second neural network. In one embodiment, iteratively increasing the number of neurons until the optimized total number of neurons is reached includes using a modified Levenberg-Marquardt approach.

What is claimed is:

1. A method of fast neural network training for library-based critical dimension (CD) metrology for a grating structure, the method comprising:
   providing a training target for a first neural network;
   training the first neural network, the training of the first neural network including use of a validation data set, the training comprising starting with a first number of neurons and iteratively increasing the number of neurons until the training target is reached using a second, larger, number of neurons, wherein the training of the first neural network includes stopping iterations for the training of the first neural network upon the occurrence of the following:
      a value of a computational cost function for the training of the first neural network is less than a predetermined value,
      the value of the computational cost function is not reduced by a predetermined percentage for a certain number of consecutive iterations, or
      an error of the validation data increases for a predetermined number of iterations;
   generating a second neural network based on the training and the second number of neurons;
   providing a spectral library based on the second neural network, the spectral library including a simulated spectrum for the grating structure; and
   comparing the simulated spectrum to a sample spectrum for the grating structure.

2. The method of claim 1, wherein iteratively increasing the number of neurons until the training target is reached comprises using a modified Levenberg-Marquardt approach.

3. The method of claim 1, wherein iteratively increasing the number of neurons comprises increasing the number of neurons in a hidden layer of the first neural network.

4. A non-transitory machine-accessible storage medium having instructions stored thereon which cause a data processing system to perform a method of fast neural network training for library-based critical dimension (CD) metrology for a grating structure, the method comprising:
   providing a training target for a first neural network;
   training the first neural network, the training of the first neural network including use of a validation data set, the training comprising starting with a first number of neurons and iteratively increasing the number of neurons until the training target is reached using a second, larger, number of neurons, wherein the training of the first neural network includes continuing iterations for the training of the first neural network until any one of the following occurs:
      a value of a computational cost function for the training of the first neural network is less than a predetermined value,
      the value of the computational cost function is not reduced by a predetermined percentage for a certain number of consecutive iterations, or
      an error of the validation data increases for a predetermined number of iterations;
   generating a second neural network based on the training and the second number of neurons; and
   providing a spectral library based on the second neural network.

5. The storage medium as in claim 4, wherein iteratively increasing the number of neurons until the training target is reached comprises using a modified Levenberg-Marquardt approach.

6. The storage medium as in claim 4, wherein iteratively increasing the number of neurons comprises increasing the number of neurons in a hidden layer of the first neural network.

7. The storage medium as in claim 4, wherein the training of the first neural network further includes stopping iterations for the training of the first neural network upon the occurrence of the following:

the number of iterations reaches a predetermined maximum number of iterations.

8. The method of claim 1, wherein the training of the first neural network further includes stopping iterations for the training of the first neural network upon the occurrence of the following:
the number of iterations reaches a predetermined maximum number of iterations.

\* \* \* \* \*